July 4, 1933. L. J. SCHUMAKER 1,916,993
THRUST PLATE
Filed Feb. 19, 1930
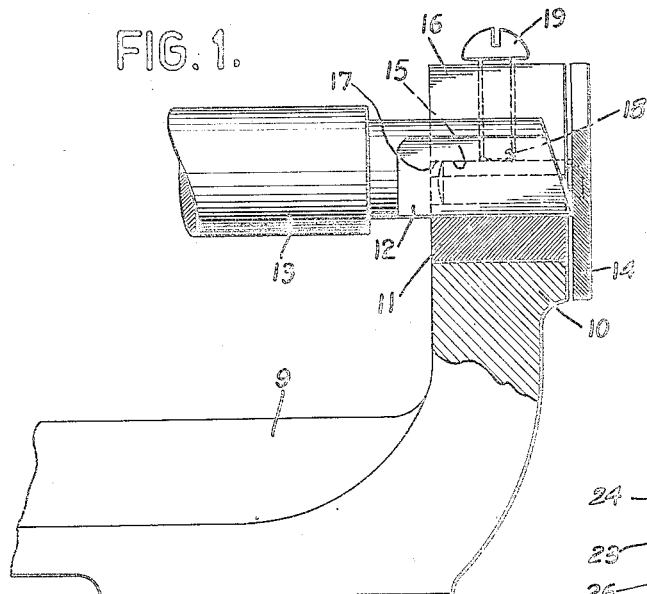
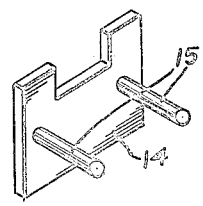
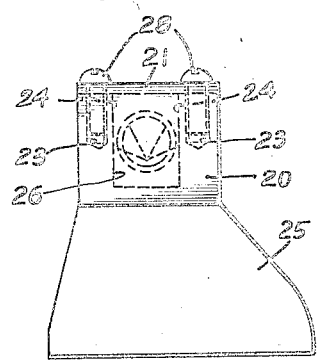
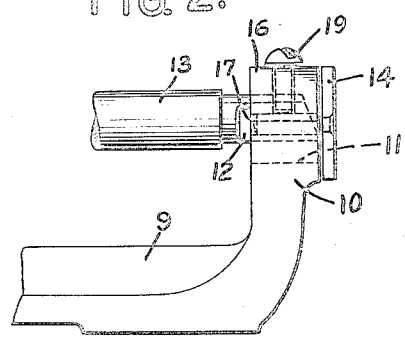
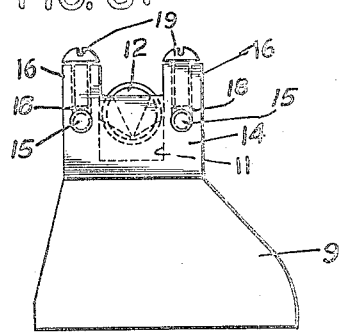
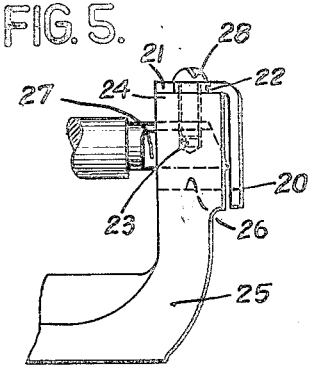
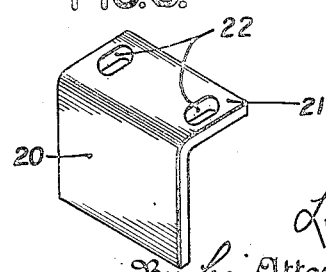
Inventor
Leo J. Schumaker
By his Attorney
W. M. Wilson Patented July 4, 1933

1,916,993

UNITED STATES PATENT OFFICE

LEO J. SCHUMAKER, OF DAYTON, OHIO, ASSIGNOR TO DAYTON SCALE COMPANY, OF DAYTON, OHIO, A CORPORATION OF NEW JERSEY

THRUST PLATE

Application filed February 19, 1930. Serial No. 429,594.

This case relates to improvements in end-thrust resisting means for a weighing scale pivot.

Heretofore, it has been necessary in using an end thrust plate to make the parts extremely accurate to assure the minimum of friction between the end of the scale pivot and the end plate.

The object of the present invention is to obviate the necessity for exercising minute care prior to assembly by providing an end thrust plate of such structure as to permit of adjustment to exact and minimum frictional position with respect to the end of the scale pivot after assembly.

Further, the novel structure admits of readjustment after the scale has been in use and parts have worn to some extent.

Various other objects and advantages of my invention will be obvious from the following particular description of one form of mechanism embodying the invention or from an inspection of the accompanying drawing; and the invention also constitutes certain new and novel features of construction and combination of parts hereinafter set forth and claimed.

In the drawing:

Fig. 1 is a section through a scale pivot bearing formed in a frame and showing the scale pivot and the thrust plate.

Fig. 2 is a side view of one end of the frame and pivot assembly.

Fig. 3 is an end view of the pivot assembly.

Fig. 4 is a perspective of the thrust plate.

Fig. 5 is a side view of a pivot assembly showing a modification of the pivot cap.

Fig. 6 is a perspective of the modified pivot cap alone, and

Fig. 7 is an end view of the modified pivot cap assembly.

Referring to the modification shown in Figs. 1 to 4, 9 is a frame member having formed at its upper right hand end 10 a rectangular cavity in the bottom of which is fixed a bearing member 11 having a V-shaped groove to pivotally support the knife edge 12 extending from the end of pivot 13. The knife edge 12 terminates in a point which engages the thrust plate 14, the point contact therebetween minimizing the friction during rocking of the pivot. In order to reduce friction to a minimum there should be as little pressure as possible between the end of the knife edge and the thrust plate. This pressure may be adjusted after the parts have been assembled due to the following construction.

The plate 14 has fixed to each side thereof a pin 15, both pins 15 extending at right angles from the face engaged by the end of the knife edge. The upper end 10 of the frame 9 has in each side 16 bounding the cavity in which the bearing 11 is disposed, a slot 17 in which a pin 15 may be freely seated. At right angles to slots 17, the tops of sides 16 are provided with threaded holes 18 to cooperate with set screws 19.

After assembly of the pivot 13 and knife edge 12 on bearing 11, the pins 15 of thrust plate 14 are inserted in the corresponding slots 17 of the sides 16 until the end of the knife edge just touches the thrust plate. Screws 19 are then turned until their ends engage the pins 15 and tightening of the screws sets the pins 15 and the thrust plate rigidly in desired position.

In Figs. 5, 6 and 7, a modification is shown in which the thrust plate 20 has a top portion 21 bent at right angles to the face thereof. A pair of elongated slots 22 are formed in top 21. When the thrust plate is assembled as shown in Figs. 5 and 7, the slots 22 are over threaded holes 23 formed in the top of sides 24 of frame 25. Between sides 24 is the cavity in which is fixed a bearing 26 to receive knife edge 27 the end of which terminates in a point engaging the thrust plate. Screws 28 pass through the slots 22 and are threaded into the holes 23. By tightening the screws, the plate 20 may be fixed in desired position. Due to the elongation of the slots 22, the position of the thrust plate may be adjused before the screws 28 are tightened.

While the above description has been confined to the several modifications shown in the drawing, it is obvious that various changes and other modifications may be made within the purview of the invention without departing from the spirit thereof. I therefore wish to be limited only by the following claim:

In combination with a knife edge and a bifurcated support therefor, an angle plate having a vertical side for engaging the end of the knife edge to resist end thrust thereof and a horizontal side for engaging the top of the support, said horizontal side provided with elongated slots, and screws threaded into each furcation of said support and passing through the slots for engaging and adjustably fixing the angle plate relative to the support.

In testimony whereof I hereto affix my signature.

LEO J. SCHUMAKER.